US012772131B2

(12) United States Patent
Spapis et al.

(10) Patent No.: US 12,772,131 B2
(45) Date of Patent: Oct. 20, 2026

(54) UPLINK SWITCH TO SOURCE CELL IN DUAL ACTIVE PROTOCOL STACK HANDOVER

(71) Applicant: Nokia Technologies Oy, Espoo (FI)

(72) Inventors: Panagiotis Spapis, Munich (DE); Ahmad Awada, Munich (DE); Halit Murat Gürsu, Munich (DE); Samantha Caporal Del Barrio, Aalborg (DK); Alperen Gundogan, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 371 days.

(21) Appl. No.: 18/292,772

(22) PCT Filed: May 19, 2022

(86) PCT No.: PCT/FI2022/050337
§ 371 (c)(1),
(2) Date: Jan. 26, 2024

(87) PCT Pub. No.: WO2023/025978
PCT Pub. Date: Mar. 2, 2023

(65) Prior Publication Data
US 2025/0048218 A1 Feb. 6, 2025

Related U.S. Application Data

(60) Provisional application No. 63/237,654, filed on Aug. 27, 2021.

(51) Int. Cl.
*H04W 36/18* (2009.01)
*H04L 5/00* (2006.01)
(Continued)

(52) U.S. Cl.
CPC ......... *H04W 36/185* (2023.05); *H04L 5/0053* (2013.01); *H04W 36/0058* (2018.08);
(Continued)

(58) Field of Classification Search
CPC ........... H04L 5/0053; H04W 36/0058; H04W 36/00837; H04W 36/185; H04W 36/24;
(Continued)

(56) References Cited

U.S. PATENT DOCUMENTS

2020/0383067 A1 12/2020 Liu et al.
2021/0250227 A1* 8/2021 Bai ..................... H04W 36/305
(Continued)

FOREIGN PATENT DOCUMENTS

WO 2020/089791 A1 5/2020
WO 2021/046809 A1 3/2021
(Continued)

OTHER PUBLICATIONS

Extended European Search Report received for corresponding European Patent Application No. 22860685.1, dated Jun. 11, 2025, 9 pages.
(Continued)

*Primary Examiner* — Thomas R Cairns
*Assistant Examiner* — Kai Chang
(74) *Attorney, Agent, or Firm* — SQUIRE PATTON BOGGS (US) LLP

(57) ABSTRACT

Systems, methods, apparatuses, and computer program products for uplink switch to source cell in dual active protocol stack handover. A method may include receiving a handover command. The method may also include identifying a maximum permissible exposure event at a user equipment before or after reception of the handover command. The method may further include delaying an uplink switch to a target network element from a source network
(Continued)

element due to the maximum permissible exposure event, or switching back to the source network element. According to certain example embodiments, delaying the uplink switch may include setting an event trigger to switch to the target network element. In addition, the method may include informing the target network element about the maximum permissible exposure event, and about the delay in the uplink switch.

20 Claims, 8 Drawing Sheets

(51) Int. Cl.
*H04W 36/00* (2009.01)
*H04W 36/24* (2009.01)
*H04W 36/36* (2009.01)
*H04W 80/02* (2009.01)

(52) U.S. Cl.
CPC ............ *H04W 36/24* (2013.01); *H04W 36/36* (2013.01); *H04W 80/02* (2013.01)

(58) Field of Classification Search
CPC . H04W 36/302; H04W 36/36; H04W 52/367; H04W 80/02
See application file for complete search history.

(56) References Cited

U.S. PATENT DOCUMENTS

2022/0353042 A1* 11/2022 Gao ...................... H04L 5/0051
2022/0386204 A1* 12/2022 Parichehrehteroujeni .................. H04W 24/08
2023/0058401 A1* 2/2023 Yuan .................. H04W 52/365
2023/0062512 A1* 3/2023 Yuan .................. H04B 7/06964
2023/0063931 A1* 3/2023 Damnjanovic . H04W 36/00698
2023/0141020 A1* 5/2023 Yuan .................... H04B 7/0404 370/318
2023/0155660 A1* 5/2023 Zhang ................ H04B 7/06956 375/267
2024/0063859 A1* 2/2024 Grieco ................. H04B 7/0486

FOREIGN PATENT DOCUMENTS

WO 2021/086249 A1 5/2021
WO 2021/091450 A1 5/2021

OTHER PUBLICATIONS

"MPE impact on MRO", 3GPP TSG-RAN WG2 Meeting #115 Electronic, R2-2107512, Agenda: 8.13.2.3, Nokia, Aug. 9-27, 2021, 2 pages.
"Corrections to Inter-Node Signalling for MPE Reporting", 3GPP TSG-RAN WG2 Meeting #112 Electronic, R2-2009165, Nokia, Nov. 2-13, 2020, 23 pages.
"3rd Generation Partnership Project; Technical Specification Group Radio Access Network; NR; NR and NG-RAN Overall Description; Stage 2 (Release 16)", 3GPP TS 38.300, V16.5.0, Mar. 2021, pp. 1-151.
"Msc-generator", Sourceforge, Retrieved on Feb. 2, 2024, Webpage available at :https://sourceforge.net/projects/msc-generator/.
"3rd Generation Partnership Project; Technical Specification Group Radio Access Network; NR; Requirements for support of radio resource management (Release 17)", 3GPP TS 38.133, V17.1.0, Mar. 2021, 2172 pages.
"3rd Generation Partnership Project; Technical Specification Group Radio Access Network; NR; User Equipment (UE) radio transmission and reception; Part 2: Range 2 Standalone (Release 17)", 3GPP TS 38.101-2, V17.1.0, Mar. 2021, pp. 1-189.
Boccardi et al., "Why to Decouple the Uplink and Downlink in Cellular Networks and How To Do It", IEEE Communications Magazine, vol. 54, No. 3, Mar. 2016, pp. 110-117.
International Search Report and Written Opinion received for corresponding Patent Cooperation Treaty Application No. PCT/FI2022/050337, dated Aug. 18, 2022, 17 pages.
"3rd Generation Partnership Project; Technical Specification Group Radio Access Network; NR; Medium Access Control (MAC) protocol specification (Release 16)", 3GPP TS 38.321, V16.5.0, Jun. 2021, pp. 1-157.

* cited by examiner

UPLINK SWITCH TO SOURCE CELL IN DUAL ACTIVE PROTOCOL STACK HANDOVER

RELATED APPLICATION

This application claims priority to PCT Application No. PCT/FI2022/050337, filed on May 19, 2022, which claims priority to U.S. Provisional Application No. 63/237,654, filed on Aug. 27, 2021, each of which is incorporated herein by reference in its entirety.

FIELD

Some example embodiments may generally relate to mobile or wireless telecommunication systems, such as Long Term Evolution (LTE) or fifth generation (5G) new radio (NR) access technology, or other communications systems. For example, certain example embodiments may relate to apparatuses, systems, and/or methods for uplink switch to source cell in dual active protocol stack handover.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G network technology is mostly based on new radio (NR) technology, but the 5G (or NG) network can also build on E-UTRAN radio. It is estimated that NR will provide bitrates on the order of 10-20 Gbit/s or higher, and will support at least enhanced mobile broadband (eMBB) and ultra-reliable low-latency communication (URLLC) as well as massive machine-type communication (mMTC). NR is expected to deliver extreme broadband and ultra-robust, low-latency connectivity and massive networking to support the Internet of Things (IoT).

SUMMARY

Some example embodiments may be directed to a method. The method may include receiving a handover command. Handover command indicates any message received from the network by the UE that initiates a procedure with which UE will change the serving cell. The method may also include identifying a maximum permissible exposure event at a user equipment before or after reception of the handover command. The method may further include delaying an uplink switch to a target network element from a source network element due to the maximum permissible exposure event. According to certain example embodiments, delaying the uplink switch may include setting an event trigger to switch to the target network element. In addition, the method may include informing the target network element about the maximum permissible exposure event, and about the delay in the uplink switch.

Other example embodiments may be directed to an apparatus. The apparatus may include at least one processor and at least one memory including computer program code. The at least one memory and computer program code may also be configured to, with the at least one processor, cause the apparatus at least to receive a handover command. The apparatus may also be caused to identify a maximum permissible exposure event at the apparatus before or after reception of the handover command. The apparatus may further be caused to delay an uplink switch to a target network element from a source network element due to the maximum permissible exposure event. According to certain example embodiments, delaying the uplink switch may include setting an event trigger to switch to the target network element. In addition, the apparatus may be caused to inform the target network element about the maximum permissible exposure event, and about the delay in the uplink switch.

Other example embodiments may be directed to an apparatus. The apparatus may include means for receiving a handover command. The apparatus may also include means for identifying a maximum permissible exposure event at a user equipment before or after reception of the handover command. The apparatus may further include means for delaying an uplink switch to a target network element from a source network element due to the maximum permissible exposure event. According to certain example embodiments, delaying the uplink switch may include setting an event trigger to switch to the target network element. In addition, the apparatus may include informing the target network element about the maximum permissible exposure event, and about the delay in the uplink switch.

In accordance with other example embodiments, a non-transitory computer readable medium may be encoded with instructions that may, when executed in hardware, perform a method. The method may include receiving a handover command. The method may also include identifying a maximum permissible exposure event at a user equipment before or after reception of the handover command. The method may further include delaying an uplink switch to a target network element from a source network element due to the maximum permissible exposure event. According to certain example embodiments, delaying the uplink switch may include setting an event trigger to switch to the target network element. In addition, the method may include informing the target network element about the maximum permissible exposure event, and about the delay in the uplink switch.

Other example embodiments may be directed to a computer program product that performs a method. The method may include receiving a handover command. The method may also include identifying a maximum permissible exposure event at a user equipment before or after reception of the handover command. The method may further include delaying an uplink switch to a target network element from a source network element due to the maximum permissible exposure event. According to certain example embodiments, delaying the uplink switch may include setting an event trigger to switch to the target network element. In addition, the method may include informing the target network element about the maximum permissible exposure event, and about the delay in the uplink switch.

Other example embodiments may be directed to an apparatus that may include circuitry configured to receive a handover command. The apparatus may also include circuitry configured to identify a maximum permissible exposure event at the apparatus before or after reception of the handover command. The apparatus may also include circuitry configured to delay an uplink switch to a target network element from a source network element due to the maximum permissible exposure event. According to certain example embodiments, delaying the uplink switch may include setting an event trigger to switch to the target network element. In addition, the apparatus may include circuitry configured to inform the target network element about the maximum permissible exposure event, and about the delay in the uplink switch.

Certain example embodiments may be directed to a method. The method may include establishing a communication link with a user equipment. The method may also include receiving, from the user equipment, a notification of a maximum permissible exposure event occurring at the user equipment. According to certain example embodiments, the notification may include an indication that the user equipment will delay an uplink switch to a target network element due to the maximum permissible exposure event. The method may further include informing a source network element about the delay of the uplink switch to enable the source network element to provide uplink grants to the user equipment.

Other example embodiments may be directed to an apparatus. The apparatus may include at least one processor and at least one memory including computer program code. The at least one memory and computer program code may be configured to, with the at least one processor, cause the apparatus at least to establish a communication link with a user equipment. The apparatus may also be caused to receive, from the user equipment, a notification of a maximum permissible exposure event occurring at the user equipment. According to certain example embodiments, the notification may include an indication that the user equipment will delay an uplink switch to a target network element due to the maximum permissible exposure event. The apparatus may further be caused to inform a source network element about the delay of the uplink switch to enable the source network element to provide uplink grants to the user equipment.

Other example embodiments may be directed to an apparatus. The apparatus may include means for establishing a communication link with a user equipment. The apparatus may also include means for receiving, from the user equipment, a notification of a maximum permissible exposure event occurring at the user equipment. According to certain example embodiments, the notification may include an indication that the user equipment will delay an uplink switch to a target network element due to the maximum permissible exposure event. The apparatus may further include means for informing a source network element about the delay of the uplink switch to enable the source network element to provide uplink grants to the user equipment.

In accordance with other example embodiments, a non-transitory computer readable medium may be encoded with instructions that may, when executed in hardware, perform a method. The method may include establishing a communication link with a user equipment. The method may also include receiving, from the user equipment, a notification of a maximum permissible exposure event occurring at the user equipment. According to certain example embodiments, the notification may include an indication that the user equipment will delay an uplink switch to a target network element due to the maximum permissible exposure event. The method may further include informing a source network element about the delay of the uplink switch to enable the source network element to provide uplink grants to the user equipment.

Other example embodiments may be directed to a computer program product that performs a method. The method may include establishing a communication link with a user equipment. The method may also include receiving, from the user equipment, a notification of a maximum permissible exposure event occurring at the user equipment. According to certain example embodiments, the notification may include an indication that the user equipment will delay an uplink switch to a target network element due to the maximum permissible exposure event. The method may further include informing a source network element about the delay of the uplink switch to enable the source network element to provide uplink grants to the user equipment.

Other example embodiments may be directed to an apparatus that may include circuitry configured to establish a communication link with a user equipment. The apparatus may also include circuitry configured to receive, from the user equipment, a notification of a maximum permissible exposure event occurring at the user equipment. According to certain example embodiments, the notification may include an indication that the user equipment will delay an uplink switch to a target network element due to the maximum permissible exposure event. The apparatus may further include circuitry configured to inform a source network element about the delay of the uplink switch to enable the source network element to provide uplink grants to the user equipment.

BRIEF DESCRIPTION OF THE DRAWINGS

For proper understanding of example embodiments, reference should be made to the accompanying drawings, wherein:

FIG. 3(*b*) illustrates an example representation of an MPE event to the panel that serves the target gNB.

DETAILED DESCRIPTION

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for power saving for uplink switch to source cell in dual active protocol stack handover.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments. Further, the terms "cell", "node", "gNB", or other similar language throughout this specification may be used interchangeably.

Figure 1:
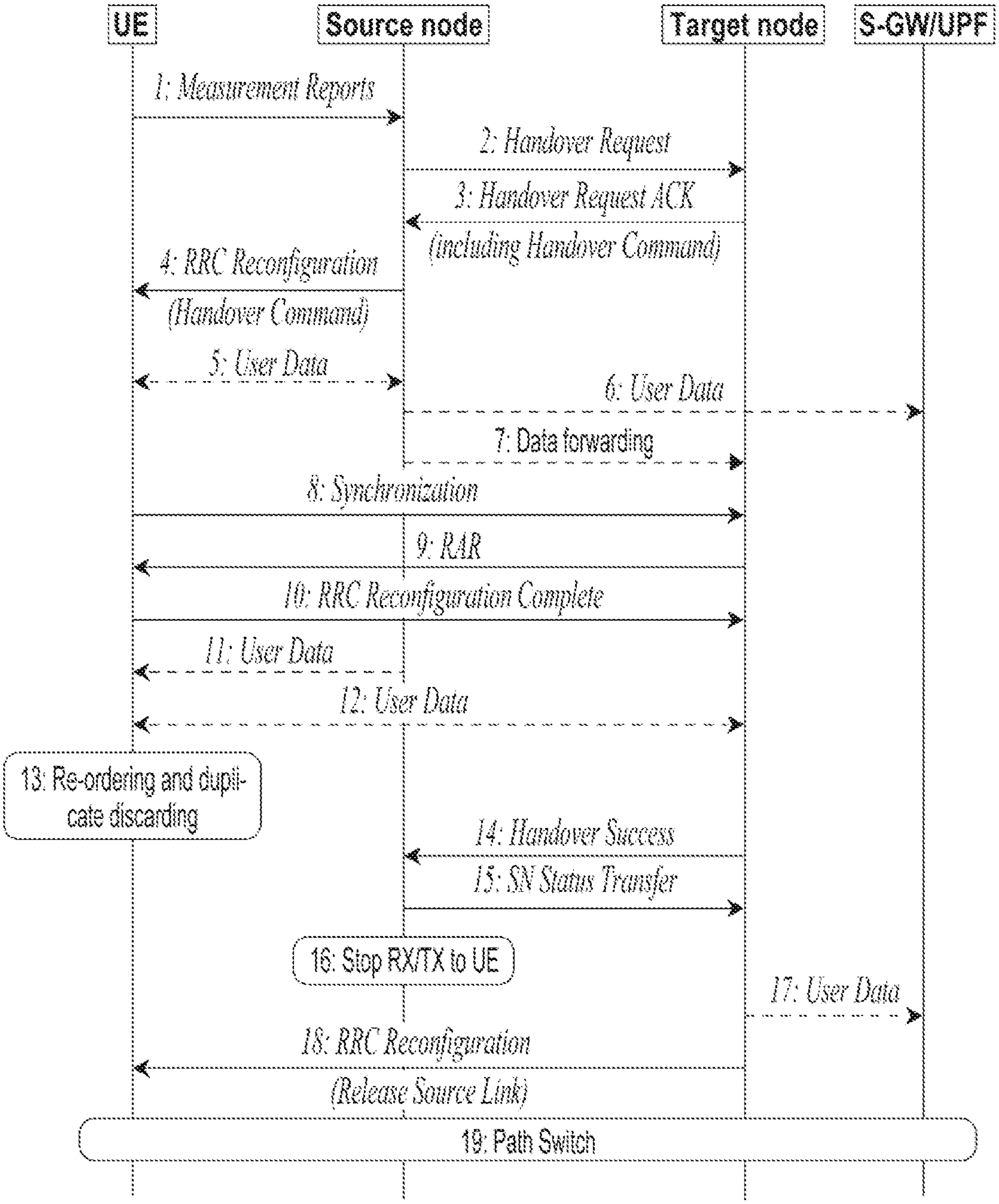
FIG. 1 illustrates an example dual active protocol stack (DAPS) signaling diagram.

3rd Generation Partnership Project (3GPP) describes dual active protocol stack (DAPS) handover (HO) as reducing the interruption time in downlink (DL) and uplink (UL). In this regard, FIG. 1 illustrates an example DAPS signaling diagram. Specifically, FIG. 1 illustrates a DAPS signaling diagram where each of the source and target node has full L2 protocol stack with their own security key for ciphering and deciphering the packet data convergence protocol (PDCP) service data units (SDUs). The UE may initiate HO procedures to the target node (operations 1-7), and establish a new radio link with the target node (operations 8-10) before detaching from the source node (operation 18). As illustrated in in FIG. 1, the UE may receive data from both the source node (operation 11) and the target node (operation 12) before releasing the source node. If the procedure fails (e.g., when the UE does not manage to set up a connection with the target cell, i.e., HO failure case), the UE may fallback to the source if it still has a sufficient radio link (i.e., timer T310 for radio link monitoring of the source cell did not expire).

When the UE completes the random access successfully to the target cell (i.e., receive random access channel (RACH) response (RAR) in case of contention free random access (CFRA), or physical downlink control channel (PDCCH) addressed to a cell radio network temporary identifier (C-RNTI) in case of contention based random access (CBRA)), the UE may switch the UL user plane transmission from the source cell to the target cell. That is, after the UL switch, the UE may start to send new PDCP SDUs, and the PDCP SDUs for which the successful delivery have not been confirmed by lower layers to the target cell. However, all other UL transmissions towards the source cell (e.g., hybrid automatic repeat request (HARQ) and radio link control (RLC) (re) transmissions, HARQ feedback, RLC/PDCP status report, CSI measurements, etc.) are continued.

Following the procedure illustrated in FIG. 1, the target cell may indicate to the UE to release the source cell directly after the sequence number (SN) status transfer (operation 15) using the radio resource control (RRC) reconfiguration (operation 18). However, following this procedure is not mandatory, and the target node may delay the release of the source node to ensure that the newly established link (with the target) is stable (i.e., the time instant for sending "handover success" message to the source cell is left for the network implementation.

Figure 2:
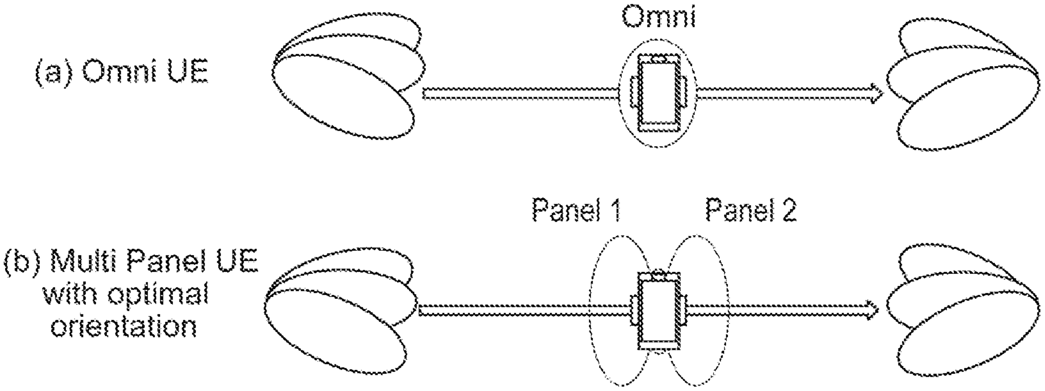
FIG. 2 illustrates an example of user equipment (UE) connectivity cases considering multi-panel (MP) UEs and the UE orientation.

FIG. 2 illustrates an example of UE connectivity cases considering multi-panel (MP) UEs and the UE orientation. In frequency range 2 (FR2), the UE may have multiple panels (i.e., MP UE) with receive beamforming and spatial interference suppression capability. Such UEs may be able to maintain high link quality with both source and target cells at the same time. This is because, depending on the UE orientation, multiple panels of the UE may provide significant gain and spatial filter, as illustrated in FIG. 2 case (b) compared to case (a).

With regard to maximum permissible exposure (MPE), governmental exposure guidelines have been set to prevent health issues due to thermal effects. The MPE is the regulation on power density for the mmWave regime and the Federal Communications Commission (FCC) has set the threshold for MPE at 10 W/m2 (1 mW/cm2). For a certain distance separating the human tissue from the antenna, a power back-off (PBO) is required for FCC compliance with MPE. In some cases, mmW NR UEs may equip each panel with a proximity sensor in order to comply with MPE regulation.

Figure 3A:
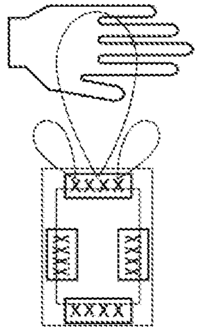
FIG. 3(*a*) illustrates an example maximum permissible exposure (MPE) event/scenario.
Figure 3B:
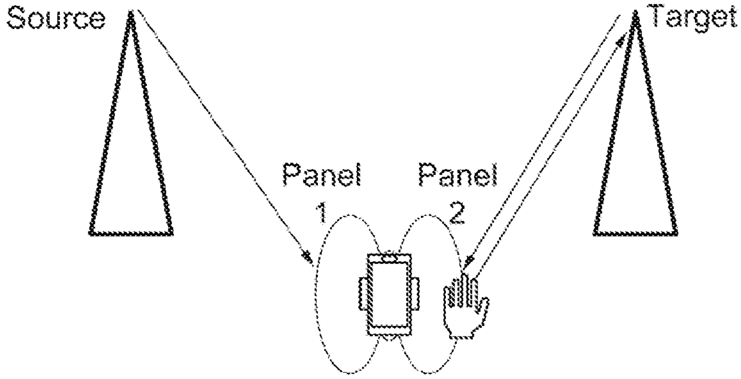

When a user body (e.g. hand) reaches the vicinity of a transmitting panel, the device may need to perform a PBO and reduce its transmitting power in order to limit the absorbed electromagnetic power density when a user body is exposed to mm-wave radiation. An illustration of an MPE event/scenario is shown in FIG. 3(*a*). As illustrated in FIG. 3(*a*), and MPE event may be defined by a UE having to reduce its output power to comply with regulatory limits. The reduction is a power management-maximum power reduction (P-MPR) value reported to the gNB in a power headroom report (PHR). Furthermore, the UE may sense the user presence with a proximity detector including, for example, an infrared sensor, capacitive sensors, radar technology, and other similar types of sensor devices.

As noted above, an MPE event is triggered at the UE, the UE may apply P-MPR, and send a PHR (including P-MPR information) to the network. This is a reactive MPE mitigation mechanism. 2-bits indicate the P-MPR level as shown in Table 1.

TABLE 1

MPE events reported for serving link in PHR

| Reported value | Measured quantity value | Unit |
|---|---|---|
| P-MPR_00 | 3 < P-MPR < 6 | dBm |
| P-MPR_01 | 6 < P-MPR < 9 | dBm |
| P-MPR_02 | 9 < P-MPR < 12 | dBm |
| P-MPR_03 | P-MPR > 12 | dBm |

Following DAPS HO, the network may provide the UE the HO command, and the UE may perform RACH to the target cell. After successful RACH, the UE may directly switch the UL to the target cell. The network may delay the release of the source cell to improve reliability of the DL through packet duplication from the source cell and the target cell. In such a case, the UE may maintain a connection with both the source cell and the target cell for DL, and only with the target cell for UL.

FIG. 3(*b*) illustrates an example representation of an MPE event to the panel that serves the target gNB. When an MPE event occurs during the HO in the panel that serves the target gNB, the UL may be heavily impacted due to UL power limitations (and blockage), even though the panel that serves the source gNB remains free of MPE. When an MPE event occurs during the HO in a specific panel (e.g., panel 2 in FIG. 3(*b*)) that serves the target gNB, the UE may perform a PBO (e.g., P-MPR) such that the UE operating in UL power limitation may be affected for example, up to 20 dB (i.e., the PBO will harm the UL). Additionally, UL throughput may be reduced due to the PBO and blockage, which may in turn endanger UE UL quality of service (QOS) requirements. Further, the target gNB may not be able to successfully decode the UL packets due to the sudden PBO, which may lead to RL failure as the maximum number of RRC retransmissions is reached in UL. Thus, using panel 2 in case of an MPE for UL may lead to RLF, and increase the interruption time during the HO.

According to certain example embodiments, in case of an MPE event on the panel that serves the target cell during a DAPS HO, the UE may maintain the UL communication with the source cell. This may occur in various cases. For example, in one case, the MPE event may occur before the completion of the random access. In this case, the UE may maintain the UL with the source gNB, and inform the target gNB. That is, the UE may not perform UL switch, and may keep transmitting the PDCP SDUs to the source gNB. In another case, the MPE event may occur after the completion of the random access. Here, the UE may revert the UL to the source gNB, and inform the target gNB. In particular, the UE may transmit the PDCP SDUs to the source gNB.

According to other example embodiments, when the MPE event ends, the UE may switch the UL to the target gNB upon informing the network. In some example embodiments, the UE may inform the source gNB about the end of the MPE event, and the UL switch to the target gNB. The source gNB may then inform the target gNB about the end of the MPE event. In other example embodiments, the UE may inform the target gNB about the end of the MPE event, and the UL switch to the target gNB. The target gNB may then inform the source gNB about the end of the MPE vent. In further example embodiments, the UE may in form the source gNB about the end of the MPE event, and inform the target gNB bout the UL switch to the target gNB. According to certain example embodiments, if the MPE event persists but if the received signal power from the source gNB is below a certain threshold (can be UE implementation specific or network configuration), the UE may release the source gNB, and switch UL to the target gNB.

Figure 4:
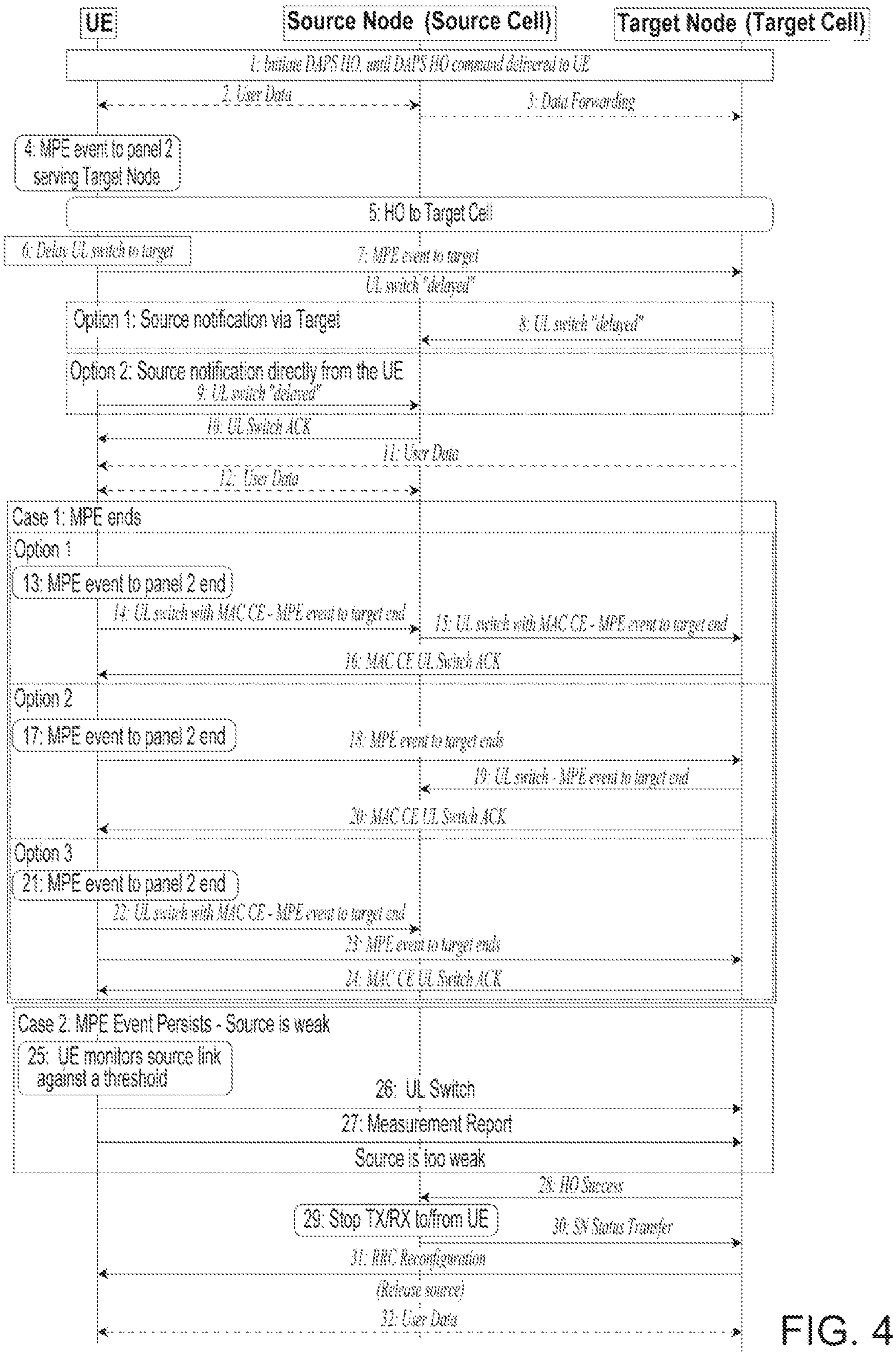
FIG. 4 illustrates an example signal diagram, according to certain example embodiments.

FIG. 4 illustrates an example signal diagram, according to certain example embodiments. In particular, signal diagram illustrates an UL switch delay during DAPS HO. In particular, FIG. 4 illustrates DAPS HO with delay in the UL switch due to an MPE event that occurs before the completion of the random access procedure. Operations 1-5 in FIG. 4 follow the normal procedure as defined in 3GPP. At 4, the UE may identify an MPE event on the panel which will be used to serve the target node. At 5, the HO to the target node may be initiated. According to certain example embodiments, operation 5 may include operations 8-10 illustrated in FIG. 1. At 6, the UE may decide to delay the UL switch to the target node due to the MPE event. At 7, the UE may inform the target node about the MPE event, and that it will delay the UL switch due to the MPE event.

According to certain example embodiments, the source node may be notified about delay in the UL switch. Instance, at 8, the target node may inform the source node about the delay of the UL switch so as to enable the source node to provide UL grants to the UE. Alternatively, at 9, the UE may inform the source node directly about the delay of the UL switch.

At 10, the source node may provide an acknowledgment to the UE about the delay of the UL switch. Further, at 11 and 12, the UE may receive DL data from both the target node and the source node, respectively. At 12, the UE may also send its UL data to the source node.

As further illustrated in FIG. 4, in certain example embodiments, at 13, the MPE event to the panel that serves the target node may end. Once the MPE event has ended, at 14, the UE may inform the source node about the end of the MPE event via a medium access control control element (MAC CE). Further, at 15, the source node may inform the target node about the end of the MPE event. At 16, after being informed about the end of the MPE event by the source node, the target node may inform the UE about the acknowledgment of the UL switch via a MAC CE.

In alternative example embodiments, at 17, the UE may determine that the MPE event to the panel that serves the target node has ended. At 18, the UE may inform the target node about the end of the MPE event. After becoming aware of the end of the MPE event, at 19, the target node may inform the source node about the end of the MPE event via a MAC CE. At 20, in response to being informed about the end of the MPE event, the target node may send an acknowledgment to the UE about the UL switch via a MAC CE.

In further example embodiments, at 21, the UE may determine that the MPE event to the panel that serves the target node has ended. At 22, the UE may inform the source node about the end of the MPE event via a MAC CE. At 23, the UE may also inform the target node about the end of the MPE event. At 24, the target node may send an acknowledgment to the UE about the UL switch via a MAC CE.

According to certain example embodiments, at 25, the UE may monitor and evaluate the source link (i.e., wireless communication link between the UE and the source gNB) against a provided threshold. In certain example embodiments, the UE may check the signal measurements of the source gNB which can be associated with a synchronization signal block (SSB) and/or channel state information (CSI) reference signals (CSI-RS), and can derive L1-reference received power (L1-RSRP), L1-reference signal received quality (L1-RSRQ), signal to noise or interference ratio (SINR), L3-RSRP, etc. Furthermore, the provided threshold value may be compared with at least one of the measurement quantities described above. In some example embodiments, the threshold may be either statically defined, or provided with the HO command (message 4 in FIG. 1). The UE may also identify that it has become too weak. For instance, the UE may evaluate the source link reception level and find it to be below a predefined threshold. In some example embodiments, the source link reception level may be below a predefined threshold for a certain period of time. At 26, the UE may perform an UL switch to the target node, and may inform the target node of the switch.

At 28-32, the HO is finalized following the procedure of DAPS in 3GPP Rel. 16. For example, at 28, the target node may inform the source node that the HO was successful. At 29, the source node may stop Tx/Rx to/from the UE. At 30, the source node may perform an SN status transfer to the target node. During the SN status transfer, an UL PDCP SN and a hyper frame number (HFN) receiver status, and a DL PDCP SN and a HFN transmitter status may be transferred either, from the source to the target node, or between the source and the target nodes involved in dual connectivity. At 31, the target node may initiate RRC reconfiguration with the UE to establish a radio link with the UE, and release the source node. At 32, the UE and target node may exchange user data. However, as illustrated in FIG. 4, in other example embodiments, the UE and the target node may exchange data throughout the procedure after operation 5.

Figure 5:
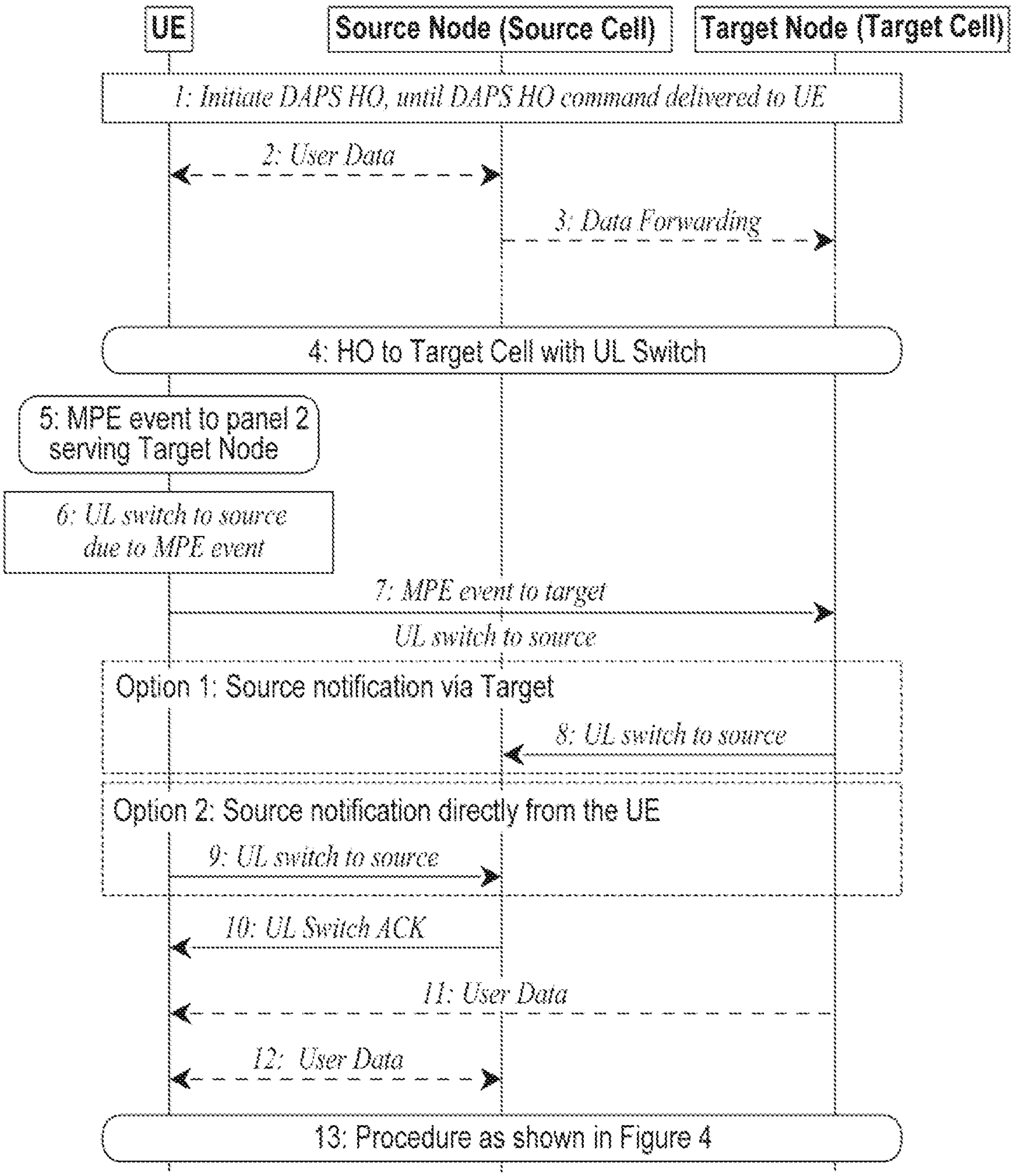
FIG. 5 illustrates another example signal diagram, according to certain example embodiments.

FIG. 5 illustrates another example signal diagram, according to certain example embodiments. In particular, the signal diagram illustrates an UL switch fallback procedure to the source node during DAPS HO due to an MPE event that occurs after the completion of the random access procedure. However, in certain example embodiments the term random access procedure may include further steps as captured by operations 8-12 in FIG. 1 and may not be strictly random access procedure. According to certain example embodiments, for this to occur, the UE must maintain connection with both the source gNB and the target gNB (i.e., the target gNB may delay the transmission of the HO success). As illustrated in FIG. 5, operations 1-5 show the normal procedure for DAPS HO. In particular, at 1, DAPS HO may be initiated between the UE, source node, and target node. At 2, user data may be transmitted between the UE and the source node. At 3, the source node may perform data forwarding to the target node. At 5, HO to the target node may be initiated with the UL switch from the source node to the target node. At 5, the UE may identify an MPE event on panel 2, which is the panel used to serve the target node. At 6, the UE may switch the UL from the target node to the source node due to the MPE event.

As further illustrated in FIG. 5, at 7, the UE may inform the target node about the MPE event and the UL switch to the source node. According to certain example embodiments, at 8, the source node may be notified about the UL switch to the source node from the target node. Alternatively, in other example embodiments, at 9, the UE may inform the source node directly about the UL switch to the source node. At 10, the source node may send an acknowledgment to the UE about the UL switch. At 11 and 12, the UE may receive DL data from both the target node and the source node after operation 4, respectively. However, at 12, the UE may send its UL data only to the source node. At 13, the procedure may proceed as shown in FIG. 4.

Figure 6:
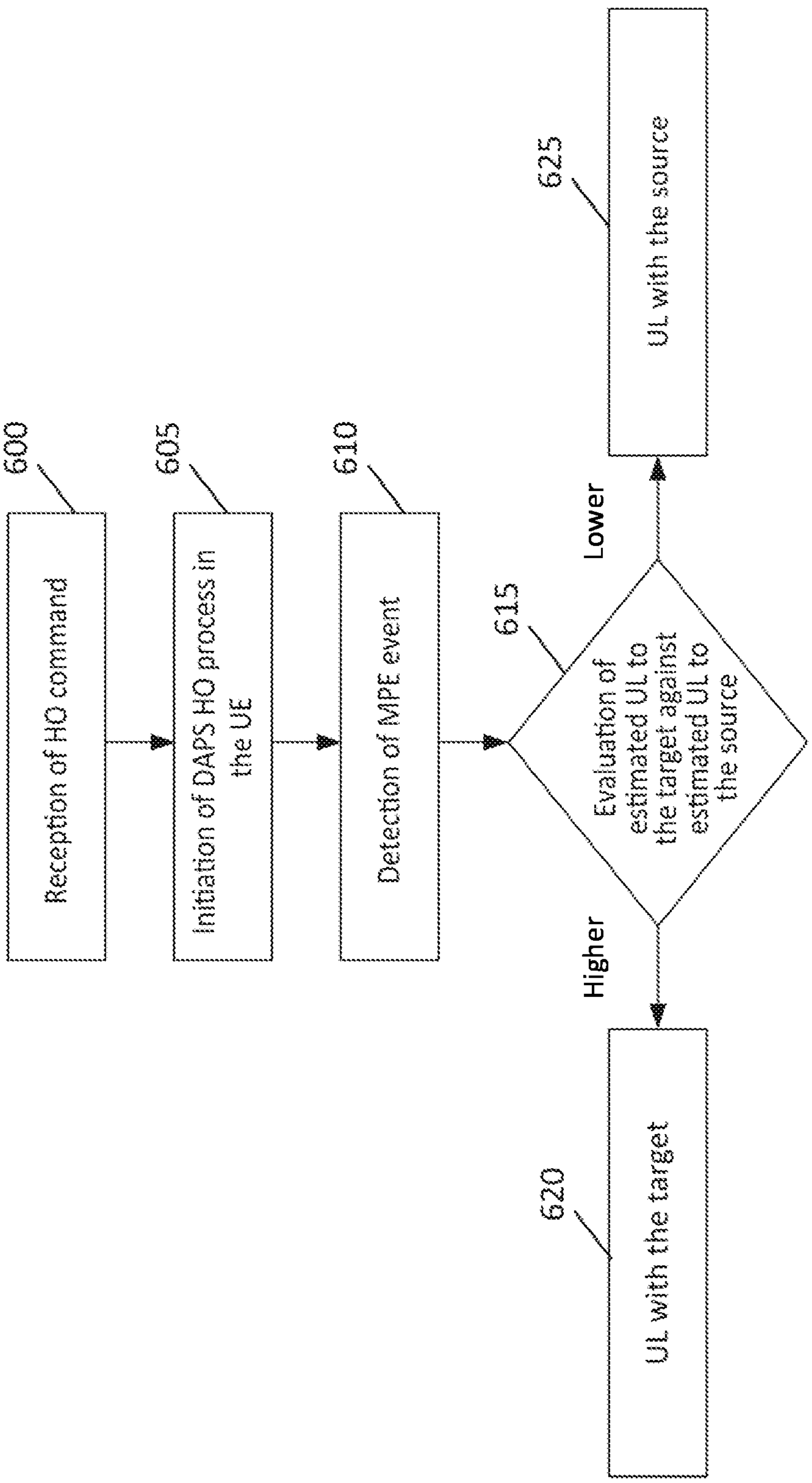
FIG. 6 illustrates an example flow diagram of a decision procedure, according to certain example embodiments.

FIG. 6 illustrates an example flow diagram of a decision procedure, according to certain example embodiments. In particular, FIG. 6 illustrates a decision procedure for delaying the UL switch from the source node to the target node. As illustrated in FIG. 6, the decision of whether to switch (or not) the UL from the source node to the target node may be based on a comparison of an estimate of the UL status (e.g., path loss (PL) and MPE if any) to the source node, and estimated UL status (e.g., PL and MPE if any) to the target node. Further, the comparison may be based on the DL reference signal receive power (RSRP) values measured in the UE side. In certain example embodiments, channel reciprocity may be assumed to give an estimation of the UL PL. For instance, the comparison may be provided by a comparison of the following values:

$$UL(\text{target}) = PL\ (\text{target link}) + P - MPR\ (\text{target } UE \text{ panel})$$

$$UL(\text{source}) = PL\ (\text{source link}) + P - MPR\ (\text{source } UE \text{ panel})$$

At 600, the UE may receive an HO command. At 605, in response to receiving the HO command, the UE may initiate a DAPS HO process. At 610, the UE may detect an MPE event. At 615, the UE may evaluate an estimated UL to the target node against an estimated UL to the source node. For example, as noted above, the evaluation may include a comparison of the estimate of the UL status (e.g., PL and MPE if any) to the source node, and an estimated UL status (e.g., PL and MPE if any) to the target node. At 620, if the estimated UL to the target node is higher than the estimated UL to the source node, then UL switch to target node may be performed. However, at 625, if the estimated UL to the target node is lower than the estimated UL to the source node, then the UL may remain with the source node (i.e., no switch).

In alternative example embodiments, the decision procedure illustrated in FIG. 6 may be implemented in the network side. In such a case, the target gNB may decide the UL switch to the source gNB based on the reporting of the MPE event, and the measurements' reporting. According to certain example embodiments, the UE may be required to provide information about the panel ID that experiences the MPE event.

Figure 7:
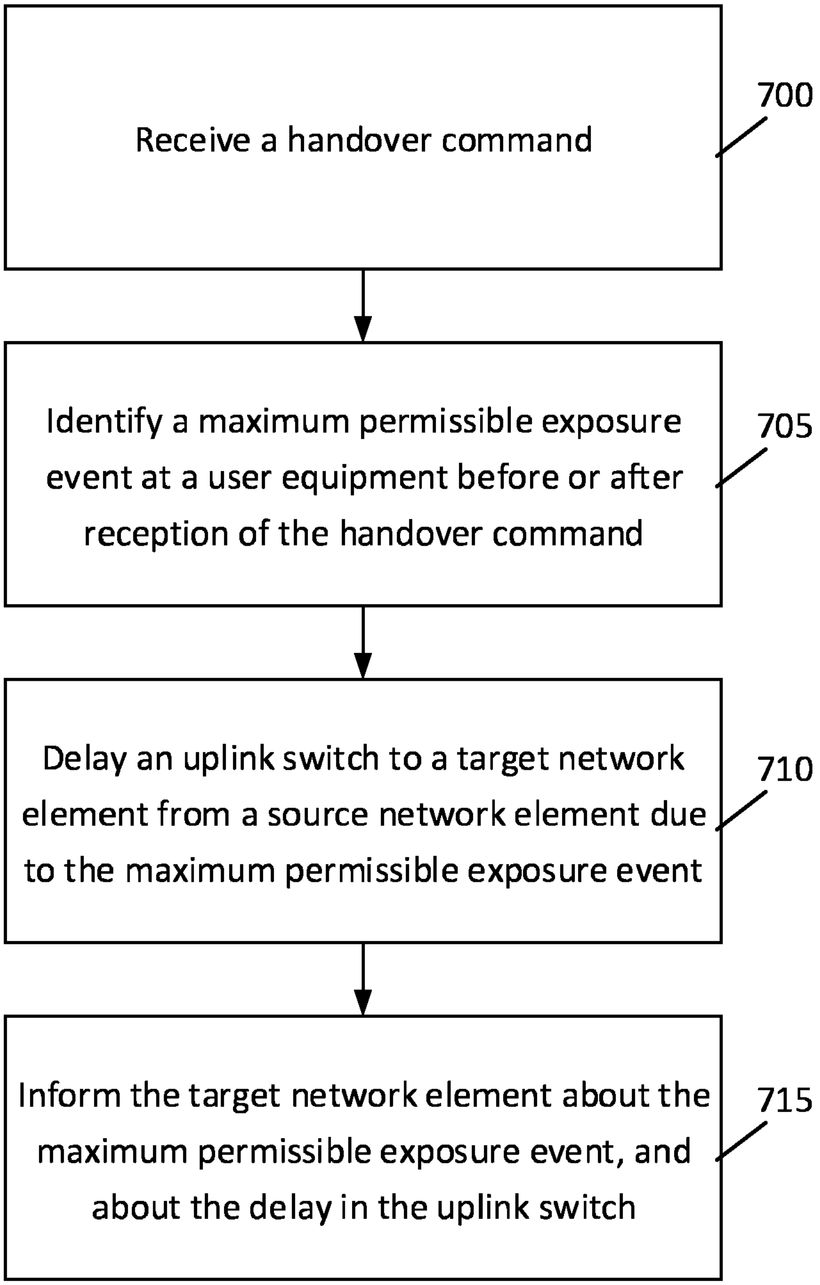
FIG. 7 illustrates an example flow diagram of a method, according to certain example embodiments.

FIG. 7 illustrates an example flow diagram of a method, according to certain example embodiments. In an example embodiment, the method of FIG. 7 may be performed by a network entity, or a group of multiple network elements in a 3GPP system, such as LTE or 5G-NR. For instance, in an example embodiment, the method of FIG. 7 may be performed by a UE similar to one of apparatuses 10 or 20 illustrated in FIG. 9.

According to certain example embodiments, the method of FIG. 7 may include, at 700, receiving a handover command. At 705, the method may include identifying a maximum permissible exposure event at a user equipment before or after reception of the handover command. At 710, the method may include delaying an uplink switch to a target network element from a source network element due to the maximum permissible exposure event. According to certain example embodiments, delaying the uplink switch may include setting an event trigger to switch to the target network element. At 715, the method may include informing the target network element about the maximum permissible exposure event, and about the delay in the uplink switch.

According to certain example embodiments, when the event trigger includes the end of the maximum permissible exposure event, the method may further include informing the source network element about the end of the maximum permissible exposure event via a message that can be a medium access control control element, or informing the target network element about the end of the maximum permissible exposure event. According to other example embodiments, the method may also include receiving an acknowledgment from the target network element about the uplink switch via the medium access control control element. In certain example embodiments, when the event trigger includes a persistence of the maximum permissible exposure event, the method may include monitoring and evaluating a source link against a threshold, performing the uplink switch to the target network element, and transmitting a measurement report to the target network element, the measurement report comprising an indication of a quality of the source link.

In certain example embodiments, when a random access procedure to the target network element has been completed, the method may further include switching from an uplink communication with the target network element to an uplink communication with the source network element. However, in other example embodiments, the switching may not be dependent on the completion of a random access procedure, and may be relevant to reception of RRC messages (such as RRC Reconfiguration Complete). In some example embodiments, the method may also include informing the target network element about the maximum permissible exposure event and the uplink switch to the source network element due to the maximum permissible exposure event. In other example embodiments, the method may include informing the source network element about the uplink switch to the source network element. In further example embodiments, the method may include receiving an acknowledgment from the source network element of the uplink switch. According to certain example embodiments, switching uplink to the target network element may be based on a comparison of an estimate of an uplink status to the source network element, and an estimated uplink status to the target network element.

Figure 8:
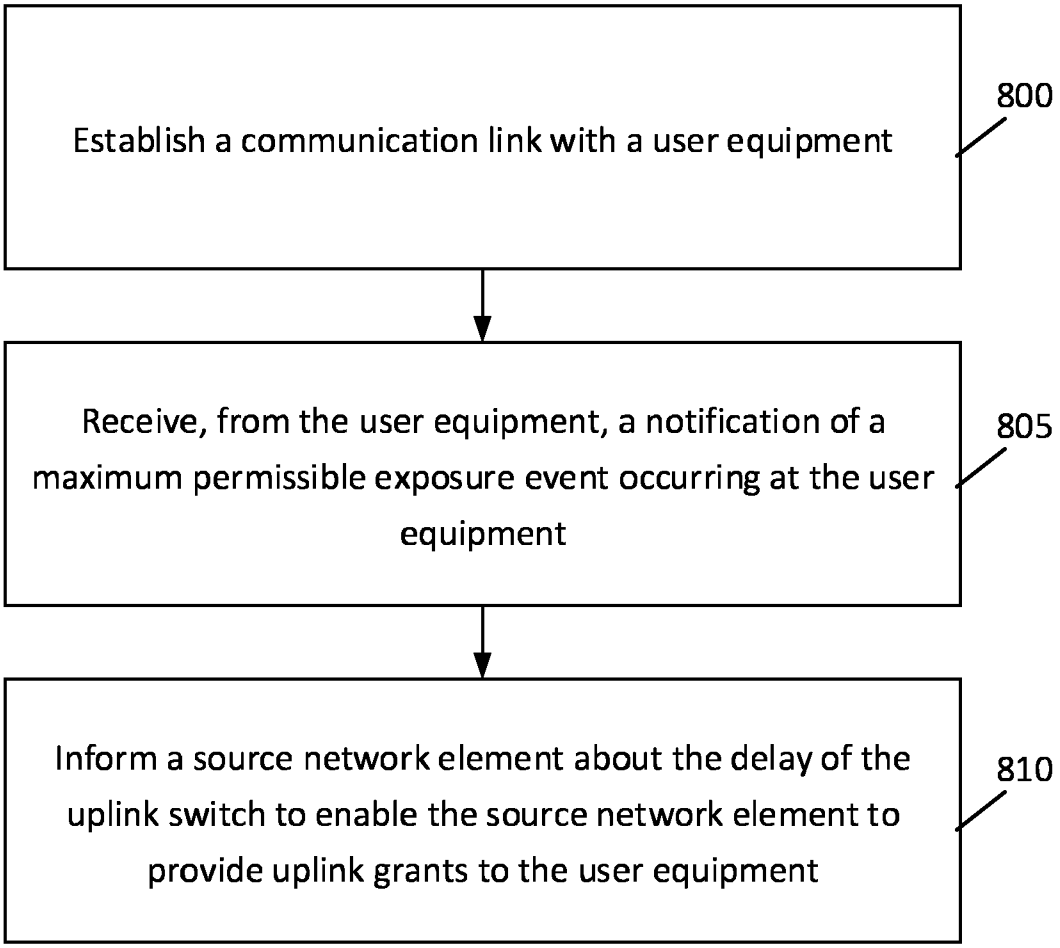
FIG. 8 illustrates an example flow diagram of another method, according to certain example embodiments.

FIG. 8 illustrates an example flow diagram of another method, according to certain example embodiments. In an example embodiment, the method of FIG. 8 may be performed by a network entity, or a group of multiple network elements in a 3GPP system, such as LTE or 5G-NR. For instance, in an example embodiment, the method of FIG. 8 may be performed by a gNB, network node, target cell, or target node similar to one of apparatuses 10 or 20 illustrated in FIG. 9.

According to certain example embodiments, the method of FIG. 8 may include, at 800, establishing a communication link with a user equipment. At 805, the method may include receiving, from the user equipment, a notification of a maximum permissible exposure event occurring at the user equipment. According to certain example embodiments, the notification may include an indication that the user equipment will delay an uplink switch to a target network element due to the maximum permissible exposure event. At 810, the method may include informing a source network element about the delay of the uplink switch to enable the source network element to provide uplink grants to the user equipment.

According to certain example embodiments, when the maximum permissible exposure event ends, the method may further include receiving a notification about the end of the maximum permissible exposure event, and informing the source network element about the end of the maximum permissible exposure event, and informing the user equipment about an acknowledgment of the uplink switch via a medium access control control element. According to some example embodiments, when the maximum permissible exposure event persists, the method may also include receiving a notification from the user equipment about the uplink switch to a target network element, and receiving a measurement report from the user equipment, wherein the measurement report may include an indication of a strength of the source link. According to other example embodiments, the method may further include receiving a notification about an uplink switch to the source network element due to the maximum permissible exposure event. In certain example embodiments, the method may also include informing the source network element about the uplink switch to the source network element.

Figure 9:
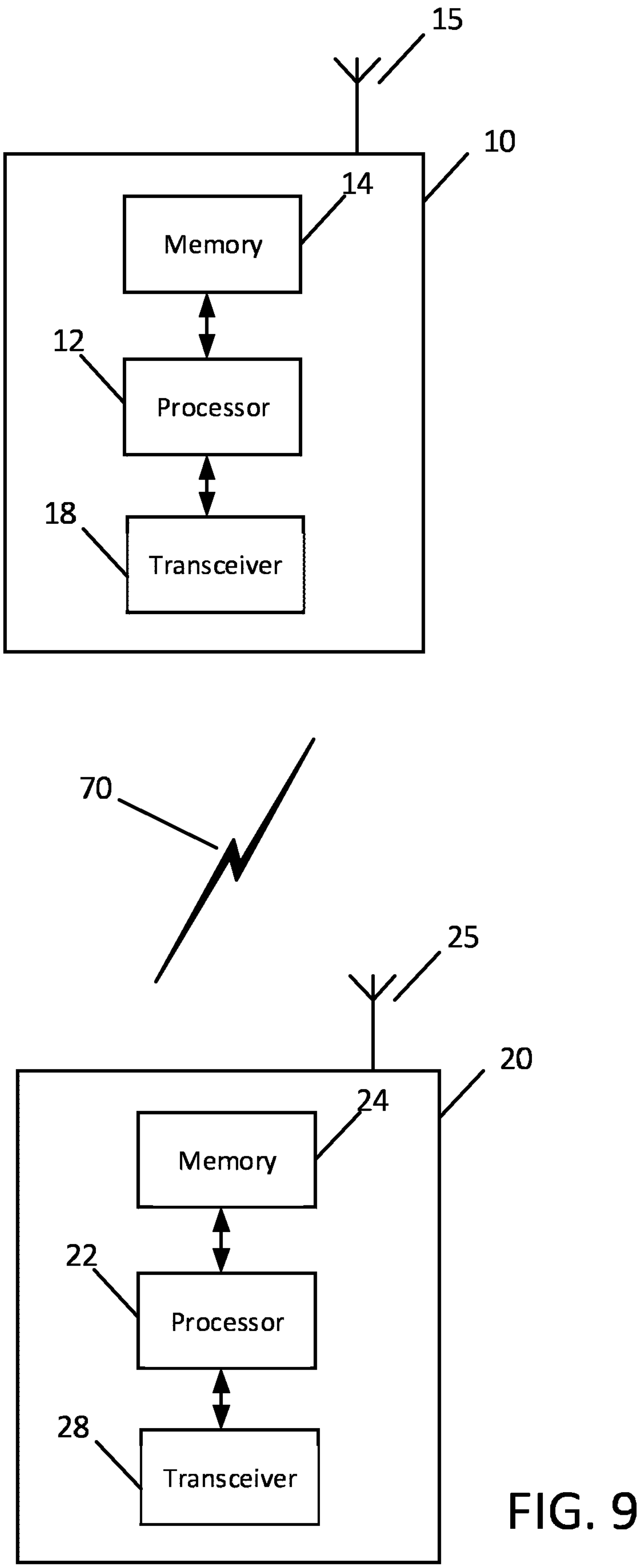
FIG. 9 illustrates a set of apparatuses, according to certain example embodiments.

FIG. 9 illustrates a set of apparatuses 10 and 20 according to certain example embodiments. In certain example embodiments, apparatus 10 may be an element in a communications network or associated with such a network, such as a UE, mobile station, mobile device, stationary device, or other device. It should be noted that one of ordinary skill in the art would understand that apparatus 10 may include components or features not shown in FIG. 9.

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 9.

As illustrated in the example of FIG. 9, apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 9, multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-7.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-7.

In some example embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

For instance, in certain example embodiments, apparatus 10 may be controlled by memory 14 and processor 12 to receive a handover command. Apparatus 10 may also be controlled by memory 14 and processor 12 to identify a maximum permissible exposure event at the apparatus before or after reception of the handover command. Apparatus 10 may also be controlled by memory 14 and processor 12 to delay an uplink switch to a target network element from a source network element due to the maximum permissible exposure event, wherein delaying the uplink switch may include setting an event trigger to switch to the target network element. In addition, apparatus 10 may be controlled by memory 14 and processor 12 to inform the target network element about the maximum permissible exposure event, and about the delay in the uplink switch.

As illustrated in the example of FIG. 9, apparatus 20 according to certain example embodiments. In certain example embodiments, the apparatus 20 may be a node or element in a communications network or associated with such a network, such as a base station, a Node B, an evolved Node B (eNB), 5G Node B or access point, next generation Node B (NG-NB or gNB), source node/cell, target node/cell, and/or WLAN access point, associated with a radio access network (RAN), such as an LTE network, 5G or NR. It should be noted that one of ordinary skill in the art would understand that apparatus 20 may include components or features not shown in FIG. 9.

As illustrated in the example of FIG. 9, apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 9, multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-6 and 8.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-6 and 8.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

For instance, in certain example embodiments, apparatus 20 may be controlled by memory 24 and processor 22 to establish a communication link with a user equipment. Apparatus 20 may also be controlled by memory 24 and processor 22 to receive, from the user equipment, a notification of a maximum permissible exposure event occurring at the user equipment. According to certain example embodiments, the notification may include an indication that the user equipment will delay an uplink switch to a target network element due to the maximum permissible exposure event. Apparatus 20 may further be controlled by memory 24 and processor 22 to inform a source network element about the delay of the uplink switch to enable the source network element to provide uplink grants to the user equipment.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

Certain example embodiments may be directed to an apparatus that includes means for performing any of the methods described herein including, for example, means for receiving a handover command. The apparatus may also include means for identifying a maximum permissible exposure event at the apparatus. The apparatus may also include means for delaying an uplink switch to a target network element from a source network element due to the maximum permissible exposure event, wherein delaying the uplink switch may include setting an event trigger to switch to the target network element. In addition, the apparatus may include means for informing the target network element about the maximum permissible exposure event, and about the delay in the uplink switch.

Certain example embodiments may also be directed to an apparatus that includes means for establishing a communication link with a user equipment. The apparatus may also include means for receiving, from the user equipment, a notification of a maximum permissible exposure event occurring at the user equipment. According to certain example embodiments, the notification may include an indication that the user equipment will delay an uplink switch to a target network element due to the maximum permissible exposure event. The apparatus may further include means for informing a source network element about the delay of the uplink switch to enable the source network element to provide uplink grants to the user equipment.

Certain example embodiments described herein provide several technical improvements, enhancements, and/or advantages. In some example embodiments, it may be possible to avoid UL failures to a target node by enabling the UE to remain with the source node for uplink operation. The number of radio link failures occurred when maximum number of RLC UL retransmission is reached due to the MPE event will be reduced, and the mobile UE will have less service interruption time during an MPE event. In other example embodiments, it may be possible to switch the UL to the target node in a timeline defined by certain UE conditions including, for example, MPE. According to further example embodiments, it may be possible to prevent MPE on the target node, when possible, and minimize QoS drop by enabling UL switch to the target node based on the UE conditions. Certain example embodiments may also improve UL robustness against an MPE event, and reduce the interruption time during DAPS HO.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with procedures in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

Partial Glossary:

3GPP 3rd Generation Partnership Project
5G 5th Generation
5GCN 5G Core Network
ACK Acknowledge
BS Base Station
DAPS Dual Active Protocol Stack
DL Downlink
eNB Enhanced Node B
FR1 Frequency Range 1
FR2 Frequency Range 2
gNB 5G or Next Generation NodeB
HO Handover
LTE Long Term Evolution
MPE Maximum Permissible Exposure
MPUE Multi Panel UE
NR New Radio
PDCCH Physical Downlink Control Channel
PDSCH Physical Downlink Shared Channel
PUCCH Physical Uplink Control Channel
PUSCH Physical Uplink Shared Channel
RRC Radio Resource Control
RSRP Reference Signal Receive Power
UE User Equipment
UL Uplink

The invention claimed is:

1. A method, comprising:

receiving a handover command;

identifying a maximum permissible exposure event at a user equipment before or after reception of the handover command;

delaying an uplink switch to a target network element from a source network element due to the maximum permissible exposure event, wherein delaying the uplink switch comprises setting an event trigger to switch to the target network element; and informing the target network element about the maximum permissible exposure event, and about the delay in the uplink switch.

2. The method according to claim 1, wherein when the event trigger comprises the end of the maximum permissible exposure event, the method further comprises one of:

informing the source network element about the end of the maximum permissible exposure event via a message that can be a medium access control control element, or informing the target network element about the end of the maximum permissible exposure event.

3. The method according to claim 2, further comprising:

receiving an acknowledgment from the target network element about the uplink switch via the medium access control control element.

4. The method according to claim 1, wherein when the event trigger comprises a persistence of the maximum permissible exposure event, the method further comprises:

monitoring and evaluating a source link against a threshold;

performing the uplink switch to the target network element; and transmitting a measurement report to the target network element, the measurement report comprising an indication of a quality of the source link.

5. The method according to claim 1, wherein when a random access procedure to the target network element has been completed, the method further comprises:

switching from an uplink communication with the target network element to an uplink communication with the source network element.

6. The method according to claim 5, further comprising:

informing the target network element about the maximum permissible exposure event and the uplink switch to the source network element due to the maximum permissible exposure event.

7. The method according to claim 5, further comprising:

informing the source network element about the uplink switch to the source network element.

8. The method according to claim 7, further comprising:

receiving an acknowledgment from the source network element of the uplink switch.

9. The method according to claim 1, wherein switching uplink to the target network element is based on a comparison of an estimate of an uplink status to the source network element, and an estimated uplink status to the target network element.

10. An apparatus, comprising:

at least one processor; and at least one memory comprising computer program code, the at least one memory and the computer program code are configured, with the at least one processor to cause the apparatus at least to receive a handover command;

identify a maximum permissible exposure event at the apparatus before or after reception of the handover command;

delay an uplink switch to a target network element from a source network element due to the maximum permissible exposure event, wherein delaying the uplink switch comprises setting an event trigger to switch to the target network element; and inform the target network element about the maximum permissible exposure event, and about the delay in the uplink switch.

11. The apparatus according to claim 10, wherein when event trigger comprises the end of the maximum permissible exposure event, the at least one memory and the computer program code are further configured, with the at least one processor to cause the apparatus at least to perform one of:

inform the source network element about the end of the maximum permissible exposure event via a message that can be a medium access control control element, or inform the target network element about the end of the maximum permissible exposure event.

12. The apparatus according to claim 11, wherein when the event trigger comprises the end of the maximum permissible exposure event, the at least one memory and the computer program code are further configured, with the at least one processor to cause the apparatus at least to:

receive an acknowledgment from the target network element about the uplink switch via the medium access control control element.

13. The apparatus according to claim 10, wherein when the event trigger comprises a persistence of the maximum permissible exposure event, the at least one memory and the computer program code are further configured, with the at least one processor to cause the apparatus at least to:

monitor and evaluating a source link against a threshold;

perform the uplink switch to the target network element; and transmit a measurement report to the target network element, the measurement report comprising an indication of a quality of the source link.

14. The apparatus according to claim 10, wherein when a random access procedure to the target network element has been completed, the at least one memory and the computer program code are further configured, with the at least one processor to cause the apparatus at least to:

switch from an uplink communication with the target network element to an uplink communication with the source network element.

15. The apparatus according to claim 14, wherein the at least one memory and the computer program code are further configured, with the at least one processor to cause the apparatus at least to:

inform the target network element about the maximum permissible exposure event and the uplink switch to the source network element due to the maximum permissible exposure event.

16. The apparatus according to claim 14, wherein the at least one memory and the computer program code are further configured, with the at least one processor to cause the apparatus at least to:

inform the source network element about the uplink switch to the source network element.

17. The apparatus according to claim 16, wherein the at least one memory and the computer program code are further configured, with the at least one processor to cause the apparatus at least to:

receive an acknowledgment from the source network element of the uplink switch.

18. The apparatus according to claim 10, wherein switching uplink to the target network element is based on a comparison of an estimate of an uplink status to the source network element, and an estimated uplink status to the target network element.

19. An apparatus, comprising:

at least one processor; and at least one memory comprising computer program code, the at least one memory and the computer program code are configured, with the at least one processor to cause the apparatus at least to establish a communication link with a user equipment;

receive, from the user equipment, a notification of a maximum permissible exposure event occurring at the user equipment, wherein the notification comprises an indication that the user equipment will delay an uplink switch to a target network element due to the maximum permissible exposure event; and inform a source network element about the delay of the uplink switch to enable the source network element to provide uplink grants to the user equipment.

20. The apparatus according to claim 19, wherein when the maximum permissible exposure event ends, the at least one memory and the computer program code are further configured, with the at least one processor to cause the apparatus at least to:

receive a notification about the end of the maximum permissible exposure event, and inform the source network element about the end of the maximum permissible exposure event, and inform the user equipment about an acknowledgment of the uplink switch via a medium access control control element.

* * * * *